(12) United States Patent
Bader

(10) Patent No.: US 7,430,923 B2
(45) Date of Patent: Oct. 7, 2008

(54) METHOD FOR OPERATING A TOOL SHAFT

(75) Inventor: Christopherus Bader, Neftenbach (CH)

(73) Assignee: Priamus System Technologies AG, Schaffhausen (CH)

( * ) Notice: Subject to any disclaimer, the term of this patent is extended or adjusted under 35 U.S.C. 154(b) by 0 days.

(21) Appl. No.: 10/582,206

(22) PCT Filed: Dec. 20, 2004

(86) PCT No.: PCT/EP2004/014471

§ 371 (c)(1),
(2), (4) Date: Dec. 18, 2006

(87) PCT Pub. No.: WO2005/059495

PCT Pub. Date: Jun. 30, 2005

(65) Prior Publication Data

US 2007/0151354 A1   Jul. 5, 2007

(30) Foreign Application Priority Data

Dec. 18, 2003   (DE) .............................. 103 59 975

(51) Int. Cl.
  *G01N 3/02* (2006.01)
(52) U.S. Cl. ...................................................... 73/856
(58) Field of Classification Search .................... 73/856
  See application file for complete search history.

(56) References Cited

U.S. PATENT DOCUMENTS

| 3,687,511 | A | * | 8/1972 | Spauschus et al. .......... 384/448 |
| 4,059,999 | A | * | 11/1977 | Engeler et al. ................ 73/745 |
| 4,623,116 | A | * | 11/1986 | Gerow ......................... 249/55 |
| 4,682,725 | A | * | 7/1987 | Martin et al. ................ 228/119 |
| 5,029,400 | A | * | 7/1991 | Leclercq et al. ............... 33/657 |
| 5,363,702 | A | * | 11/1994 | Catot et al. .................... 73/598 |
| 5,427,516 | A |   | 6/1995 | Bader et al. |
| 6,131,270 | A | * | 10/2000 | Van Den Berg ............ 29/602.1 |

FOREIGN PATENT DOCUMENTS

DE    10 117 000    11/2002

\* cited by examiner

*Primary Examiner*—Max Noori
(74) *Attorney, Agent, or Firm*—Bachman & LaPointe, P.C.

(57) ABSTRACT

A method for operating a tool shaft with the aid of a sensor element of a sensor, particularly an injection mold, in which at least one sensor, e.g. for determining an internal pressure of the mold, is assigned to the cavity. To this end, the sensor element is placed inside a sleeve with play and is subsequently calibrated, then, after determining the sensitivity, a correspondingly codeable component, e.g. a resistor, is selected, is fitted into the sensor, and the sensor, together with the sleeve, is placed inside a borehole of a mold wall.

2 Claims, 2 Drawing Sheets

METHOD FOR OPERATING A TOOL SHAFT

Figure 1:
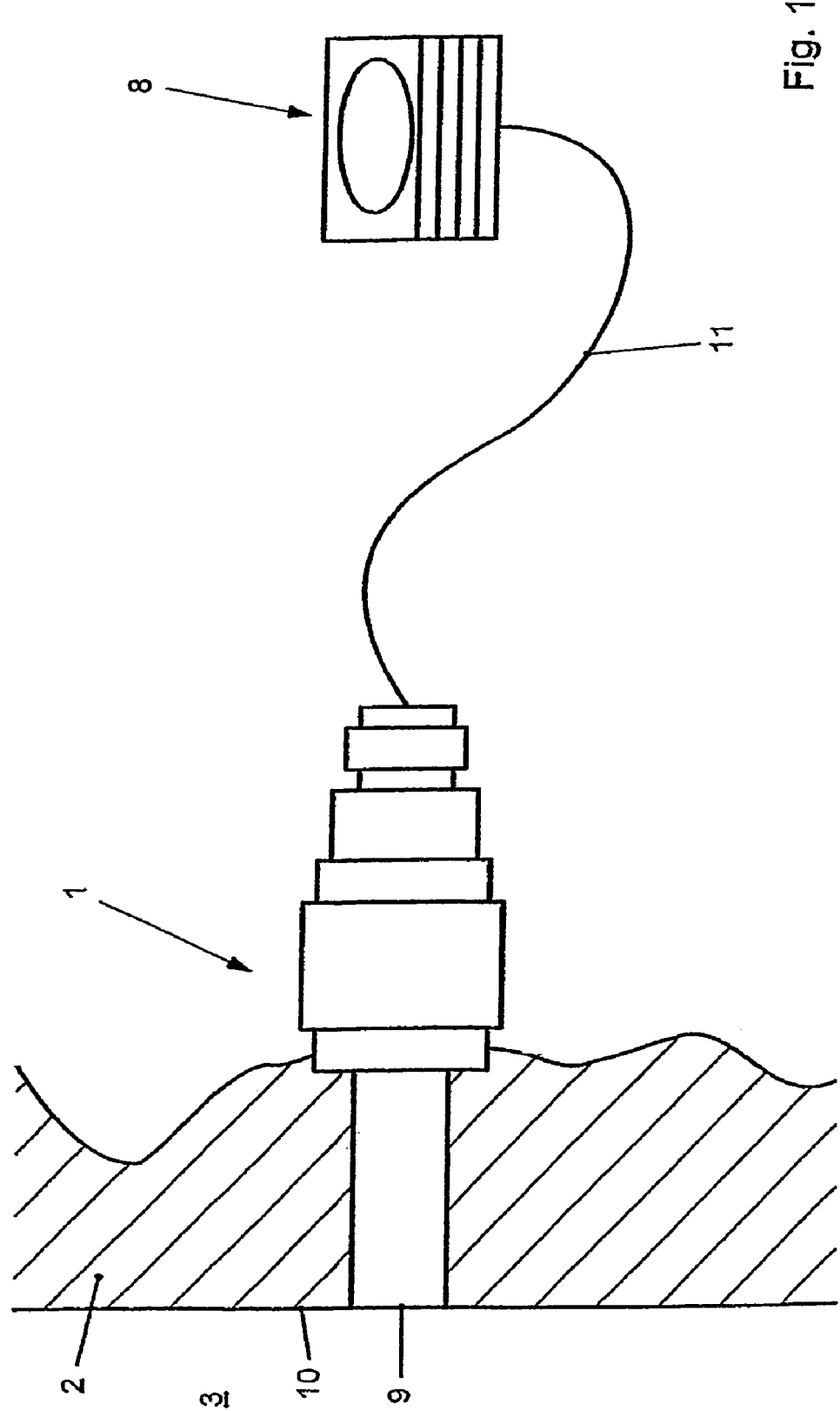

The invention relates to a method for operation of a tool shaft with the aid of a sensor element of a sensor, in particular of an injection-molding or die-casting tool, in which the cavity has at least one associated sensor, for example for determination of a tool internal pressure and the sensor element is inserted into a sleeve with play.

PRIOR ART

Sensors for an indefinitively large number of technical fields are known from the prior art, where they are used to measure physical variables. The measured physical variables may, for example, be input parameters for a controller which, in particular, accompanies and controls a production process. By way of example, it is thus possible to monitor the physical characteristics of an element to be produced during production and, if necessary, to modify appropriate parameters. For this purpose, the sensors may be in contact with the element to be produced or with the material forming the element. In order to avoid measurement corruption, the sensors should record only those variables which are intended to be determined.

In this case, by way of example, the monitoring of the tool internal pressure in injection-molding and die-casting tools is cited from the large number of fields of application. The determination of the tool internal pressure makes it possible, inter alia, to determine the time for switching from the filling pressure to the subsequent pressure.

A method for automatic identification of the sensitivity of sensors is known from DE 101 17 000 A1. The sensitivity of the sensors is determined, and a resistor is used to associate it with a specific sensor group with a predetermined sensitivity range. Once it has been selected, this sensitivity range can no longer be changed. However, when the sensor is inserted into a hole, it is possible, depending on the quality of this hole, for the sensor to touch the internal wall of the hole. This force secondary-path effect can result in the sensor losing sensitivity, which necessitates tedious recalibration of the measurement system.

Something similar is also known from U.S. Pat. No. 5,427,516. In this case as well, the complete sensor comprises a sleeve in which a sensor head is arranged, with there being clearance between the sensor head and the sleeve. This sensor is then inserted into the wall of an injection-molding or die-casting tool, and is then calibrated.

OBJECT

The object of the present invention is to prevent the force secondary-path effect, in order to maintain the selected sensitivity of the sensor even in holes of lesser quality.

ACHIEVEMENT OF THE OBJECT

In order to achieve the object, the sensor is then calibrated, thereupon after determination of the sensitivity, a correspondingly codeable component, for example a resistor, is selected, is fitted in the sensor, and the sensor is inserted with the sleeve into the hole in a tool wall.

This method according to the invention has the major advantage that no force secondary-path effect occurs in which the sensor element touches the tool internal wall, in consequence significantly adversely affecting or entirely losing its sensitivity. The quality of the hole in the tool wall can now be ignored. The only important factor is the quality of the hole in the sleeve. However, it is cheaper and easier to produce a high-quality hole in the sleeve than to produce such a hole in the tool wall. Normally, the production of high-quality holes can be left to the manufacturer of these sensor sleeves.

At this point, play also includes guides for the sensor element, which guide the sensor element with respect to the internal wall of the sleeve without friction or with virtually no friction on, for example, sliding aids and/or rollers at specific points. However, the nature of the connection to the sensor element must ensure that no force secondary path can be formed, for example by elastic suspension of the sliding aids with respect to the sensor element. Such devices could be advantageous, for example as a support for long sensor elements.

The arrangement of a sleeve in the hole in which the sensor element is guided with play shields the sensor element from the internal wall of the hole. The quality of the hole itself is then irrelevant, with the only critical factor being the quality of the sleeve, in order to define the play. A high-quality sleeve thus makes it possible for the manufacturer of the sensor to ensure the sensitivity of the sensor while complying with specific limit values for, for example, the temperature or pressure during and after its installation.

If the sensor element is arranged with a small amount of play in the sleeve, it can move freely in one preferred direction. The sensor element play can in this case be chosen such that, on the one hand, free mobility is ensured while, on the other hand, any ingress of a medium between the sensor element and the sleeve is minimized.

The material to be used for the sleeve must in this case satisfy in particular the steady-state requirements, which can be satisfied by a large number of materials. By way of example, metals, plastics, ceramics or the like may be used. At this point, it should be mentioned that a hole is one possible form of a recess. All other shapes of a recess may be used, for example with a triangular, quadrilateral or else any desired cross-sectional shape. The shape of the sleeve is also significant only to the extent that it must be possible to insert it into the recess, with the sensor element being protected against a force secondary path through the internal wall of the hole.

A further advantage of guidance in the sleeve is that the variable to be measured can be channelized to the point intended for this purpose. For example, the sensor element can thus be arranged in a sleeve in such a way that pressure acts on the sensor element from only one specific direction. This makes it possible to prevent and/or reduce measurement corruption.

The sleeve is preferably placed on a base body of the sensor, from which the sensor element also projects. This makes it possible to achieve a very robust arrangement, in which the sensor can be arranged physically simply and at low cost in the protective apparatus. The sensitivity and the sensitivity range of the sensor are thus fixed before its installation, and these parameters of the sensor need not be defined after its installation.

A fixed connection of the sleeve and base body makes the arrangement of the entire apparatus more robust. A connection by means of welding or adhesive bonding is particularly simple. If a releasable connection is desired, the sensor can also be screwed in the sleeve.

In one preferred refinement, the sensor element has an annular groove for holding a seal. The seal prevents the ingress of the medium between the sleeve and the sensor element, which could reduce the play between the sleeve and the sensor element meaning that the sensor element could not move with respect to the sleeve.

FIGURE DESCRIPTION

Figure 2:
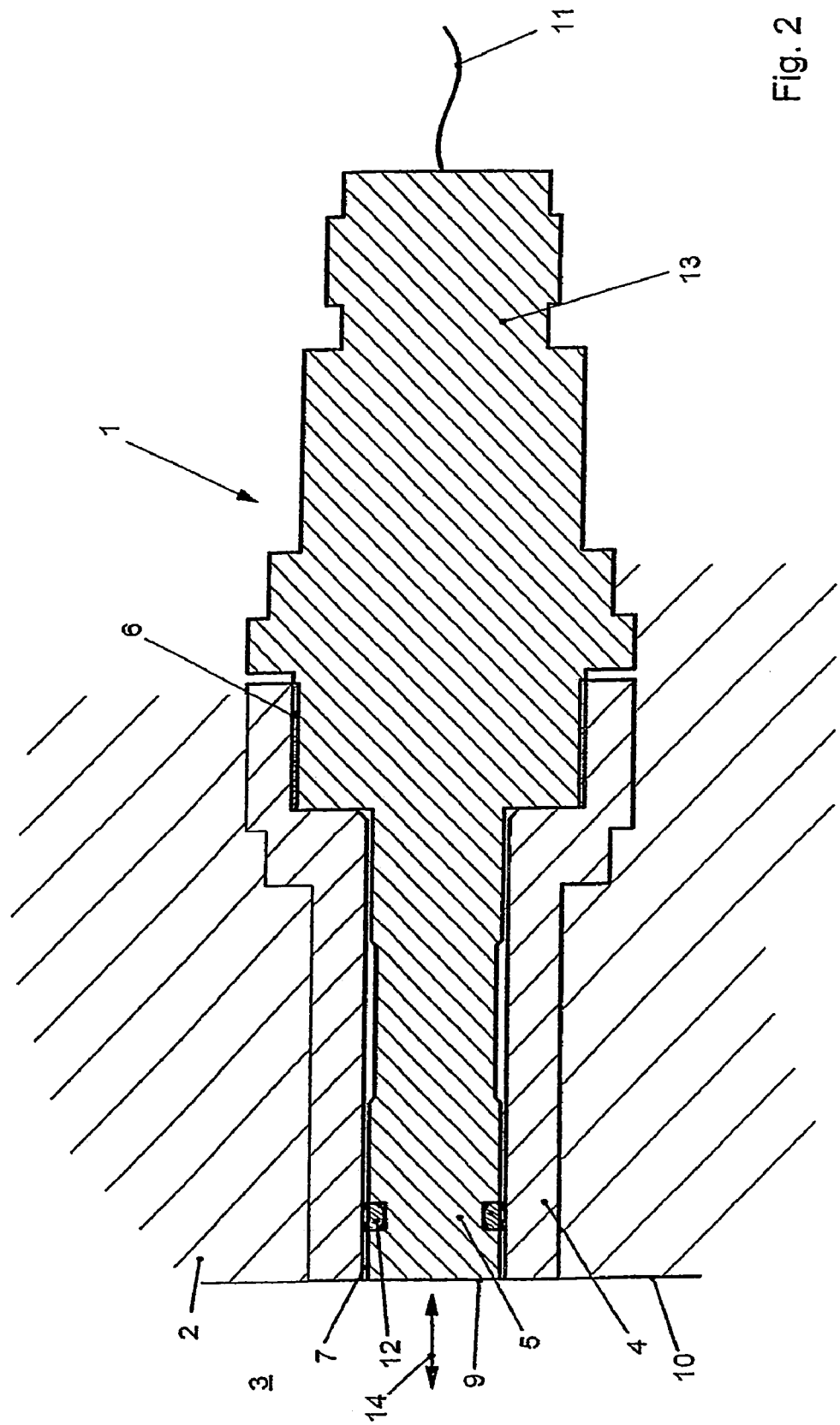

Further advantages, features and details of the invention will become evident from the following description of one preferred exemplary embodiment, and with reference to the drawing, in which:

FIG. 1 shows a schematic illustration of a sensor, which is arranged in a tool wall of an injection-molding or die-casting tool, in the form of a partial section; and FIG. 2 shows a longitudinal section, illustrated in an enlarged form, through the sensor shown in FIG. 1.

DETAILED DESCRIPTION

FIG. 1 shows a sensor 1, which is arranged in a hole in a wall 2 of a cavity 3 in an injection-molding or die-casting tool. The sensor 1 is used, for example, to measure the tool internal pressure in the cavity 3. In this case, one end wall 9 of the sensor 1 is arranged on the same plane as one internal surface 10 of the wall 2, such that it is subject to the influence of a melt entering the cavity 3.

The measured variable, for example the tool internal pressure, can be converted by the sensor 1 in particular to an electrical signal and can be passed on via a cable 11 to an evaluation unit 8, which can monitor and control the entire process. For example, this arrangement can be used in particular to determine the time to change from the filling pressure to the subsequent pressure. At this point, it should be noted that the measured variable can also be transmitted cordlessly. Transmission by other than electrical means, for example optical transmission, is also feasible.

As shown in FIG. 2, the sensor 1 has a base body 13, a sensor element 5 and a sleeve 4. The sleeve 4 is screwed to the base body 13 in such a manner that the sensor element 5 is radially surrounded by the sleeve 4. The sensor element 5 is connected to the base body 13 on its side opposite the end wall 9.

The sensor element 5 is arranged with a small amount of play 7 in the sleeve 4. This avoids any force secondary path between the wall 2 and/or the sleeve 4 and the sensor element 5.

A force secondary path such as this may arise, for example, as a result of the quality of the hole and/or as a result of different thermal expansions of the wall 2 and sensor element 5. Both effects can be suppressed by the use of the suitable sleeve 4.

The play 7 allows the sensor element 5 to move in a direction as shown by a double-headed arrow 14, in order to record the tool internal pressure to be measured, without any friction losses through contact with the sleeve 4.

A seal 12 arranged in an annular groove ensures that further penetration in the direction of the base body 13 is prevented if melt enters the interior of the sleeve 4 from the cavity 3.

The method of operation of the present invention is as follows:

Before the sensor 1 is inserted in the hole in the wall 2 of an injection-molding or die-casting tool, the sleeve 4 is placed on the base body 13 such that the sensor element 5 is guided with play 7 in the sleeve 4. The sensor 1 is actually calibrated at this stage, that is to say its sensitivity is determined. An appropriate resistor is selected on the basis of the determination of the sensitivity, as is described in DE 101 17 000 A1. This resistor is fitted to the sensor 1, after which the sensor 1 is inserted into the hole in the wall 2.

The invention claimed is:

1. A method for operation of a tool shaft with the aid of a sensor element of a sensor (1) of an injection-molding or die-casting tool, in which the cavity (3) has at least one associated sensor (1) for determination of a tool internal pressure, comprising inserting a sensor element (5) into a sleeve (4) with play (7) and, thereafter, calibrating and determining the sensitivity, selecting a correspondingly codeable resistor and fitting the resistor in the sensor (1), and subsequently inserting the sensor (1) with the sleeve (4) into a hole in a tool wall (2).

2. The method as claimed in claim 1, including forming a precision hole in the sleeve (4) to hold the sensor element (5) with play (7).

* * * * *